United States Patent [19]

Nagaoka et al.

[11] Patent Number: 5,424,360

[45] Date of Patent: Jun. 13, 1995

[54] THERMOPLASTIC RESIN COMPOSITION

[75] Inventors: Kenji Nagaoka; Hiroshi Hagimori; Takashi Sanada, all of Ichiara, Japan

[73] Assignee: Sumitomo Chemical Company, Limited, Osaka, Japan

[21] Appl. No.: 183,429

[22] Filed: Jan. 19, 1994

Related U.S. Application Data

[63] Continuation-in-part of Ser. No. 050,620, Apr. 22, 1993 abandoned, which is a continuation-in-part of Ser. No. 017,395, Feb. 12, 1993 abandoned.

[51] Int. Cl.$^6$ ............ C08L 23/12; C08L 25/10; C08L 71/12; C08L 77/06
[52] U.S. Cl. ............................ 525/66; 525/68; 525/92 G; 525/397; 525/905
[58] Field of Search ............ 525/66, 68, 92, 397, 525/905

[56] References Cited

U.S. PATENT DOCUMENTS

| | | | |
|---|---|---|---|
| 4,972,021 | 11/1990 | Lee, Jr. | 525/132 |
| 5,109,065 | 4/1992 | Saito et al. | 525/66 |

FOREIGN PATENT DOCUMENTS

| | | |
|---|---|---|
| 24120 | 4/1983 | European Pat. Off. |
| 0269748 | 6/1988 | European Pat. Off. |
| 319339 | 6/1989 | European Pat. Off. |
| 407224 | 1/1991 | European Pat. Off. |
| 442180 | 8/1991 | European Pat. Off. |
| 56-49753 | 5/1981 | Japan |
| 59-66452 | 4/1984 | Japan |
| 60-120748 | 6/1985 | Japan |
| 2284955 | 11/1990 | Japan |
| 2305854 | 12/1990 | Japan |

OTHER PUBLICATIONS

Encyclopedia of Polymer Science and Engineering, vol. 13, John Wiley & Sons, New York, (1988) pp. 478–487.

*Primary Examiner*—Thomas Hamilton, III
*Attorney, Agent, or Firm*—Cushman, Darby & Cushman

[57] ABSTRACT

A thermoplastic resin composition having a good balance among rigidity, impact strength and adhesion of coating is provided, which comprises:

a total of 100 parts by weight of (a)–(c) wherein (a) is 1–60% by weight of a polyphenylene ether, (b) 0–60% by weight of an alkenyl aromatic resin excluding unhydrogenated alkenyl aromatic block copolymer of tile following component (e) and (c) 40–99% by weight of a polyamide, (d) 1–50 parts by weight of a polyolefin having a modulus of 10000 kg/cm2 or more at room temperature, (e) 1–50 parts by weight of an unhydrogenated alkenyl aromatic block copolymer, and (f) a compatibilizing agent in an amount necessary to improve compatibility of the above components (a) and (c), said (d)–(f) being every 100 parts by weight of (a)–(c), and wherein the thermoplastic resin composition is obtained by melt kneading firstly said (a), (d) and (f) and then secondly said (c) therewith.

6 Claims, No Drawings

THERMOPLASTIC RESIN COMPOSITION

RELATED APPLICATION

This is a continuation-in-part of U.S. Ser. No. 08/050,620 filed Apr. 22, 1993 now abandoned, which is a continuation-in-part of U.S. Ser. No. 08/017,395, filed Feb. 12, 1993 now abandoned.

BACKGROUND OF THE INVENTION

The present invention relates to a novel thermoplastic resin composition which contains a polyphenylene ether resin and a polyamide resin.

Polyphenylene ether resin is a thermoplastic resin superior in various properties such as mechanical properties, heat resistance and dimensional stability. However, polyphenylene ether resin itself is considerably inferior in impact resistance and solvent resistance, and is unsatisfactory in processability due to its high melt viscosity. Polyamide resin is a thermoplastic resin superior in mechanical properties, solvent resistance and processability, but is inferior in impact resistance and heat resistance and besides, inferior in dimensional stability due to its high water absorption. In order to offset one disadvantage by one advantage, blends of the two resins have been proposed. However, blends of only the two resins lose the superior mechanical properties they possess. Therefore, it has been proposed to improve the dispersibility and the mechanical properties by adding various compatibilizing agents at the time of blending of polyphenylene ether resins and polyamide resins. The proposals are disclosed in Japanese Patent Kokoku Nos. 60-11966 and 61-10494 and Japanese Patent Kokai Nos. 59-66452 and 56-49753. The resulting PPE/nylon resin compositions are being increasingly applied to electric and electronic fields and automotive field. Furthermore, in order to improve dimensional stability when absorbing water and solvent resistance of these PPE/nylon compositions, Japanese Patent Kokai Nos. 2-305854, 2-284955 and 2-656 propose the resin compositions to which polyolefins are added, but these compositions are still insufficient in balancing of rigidity, impact strength and adhesion of coating film.

SUMMARY OF THE INVENTION

The present invention relates to a polyphenylene ether/nylon/polyolefin resin composition having a good balance among rigidity, impact strength and adhesion of coating film and superior processability.

As a result of intensive research conducted by the inventors, it has been found that good balancing of rigidity, impact strength and adhesion of coating film and good processability and moldability can be obtained by adding to PPE/nylon resin compositions a polyolefin and an alkenyl aromatic block copolymer each in an amount of a specific range.

That is, the present invention relates to a thermoplastic resin composition, characterized by comprising:

a total of 100 parts by weight of (a)-(c) wherein (a) is 1-60% by weight of a polyphenylene ether, (b) 0-60% by weight of an alkenyl aromatic resin excluding unhydrogenated alkenyl aromatic block copolymer of the following component (e) and (c) 40-99% by weight of a polyamide, (d) 1-50 parts by weight of a polyolefin having a modulus of 10000 kg/cm² or more at room temperature, (e) 1-50 parts by weight of an unhydrogenated alkenyl aromatic block copolymer, and (f) a compatibilizing agent in an amount necessary to improve compatibility of the above components (a) and (c), said (d)-(f) being every 100 parts by weight of (a)-(c), and wherein the thermoplastic resin composition is obtained by melt kneading firstly said (a), (d) and (f) and then secondly said (c) therewith.

According to the present invention, a polyphenylene ether/polyamide/polyolefin resin composition can be obtained which has good balancing of rigidity, impact strength and adhesion of coating film and superior processability and good appearance.

DESCRIPTION OF THE INVENTION

The polyphenylene ether (a) used in the present invention is a polymer obtained by oxidation polymerization of one or more of phenol compounds having the following formula:

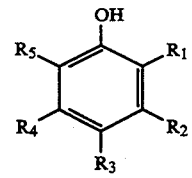

wherein $R_1$, $R_2$, $R_3$, $R_4$ and $R_5$ each represents a hydrogen atom, a halogen atom or an unsubstituted or substituted hydrocarbon group and at least one of them is a hydrogen atom, with oxygen or gas containing the same using an oxidation coupling catalyst. Examples of $R_1$, $R_2$, $R_3$, $R_4$ and $R_5$ in the above formula are hydrogen, chlorine, bromine, fluorine, iodine, methyl, ethyl, n- or iso-propyl, pri-, sec- or t-butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl, ethylphenyl and allyl.

Examples of the phenol compounds represented by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. Besides, there may also be used copolymers of the phenol compounds of the above formula with other phenol compounds, for example, polyhydric hydroxy aromatic compounds such as bisphenol-A, tetrabromobisphenol-A, resorcin, hydroquinone and novolak resin.

Preferable polymers are homopolymers of 2,6-dimethylphenol or 2,6-diphenylphenol and copolymers of a large amount of 2,6-xylenol and a small amount of 3-methyl-6-t-butylphenol or 2,3,6-trimethylphenol.

The oxidation coupling catalysts used for oxidation polymerization of the phenol compounds have no special limitation and any catalysts can be used as long as they have polymerization ability.

The alkenyl aromatic resin (b) [excluding the unhydrogenated alkenyl aromatic block copolymer (e) referred to hereinafter] in the present invention is a polymer comprising one or more polymeric units selected from styrene, α-methylstyrene, p-methylstyrene and the like. Examples are polystyrene, rubber-reinforced polystyrene, poly-α-methylstyrene, poly-p-methylstyrene and styrene-acrylonitrile copolymer. The above-mentioned polyphenylene ethers on which styrene polymers are grafted are also included.

However, the unhydrogenated alkenyl block copolymers (e) mentioned hereinafter are excluded from the component (b).

Mixing or grafting amount of the alkenyl aromatic resin (b) is preferably 60% by weight or less based on the polyphenylene ether/polyamide in the resin composition. If it is more than 60% by weight, the thermoplastic resin composition conspicuously deteriorate in impact resistance and heat resistance.

The polyamide (c) used in the present invention is one or more of polyamides selected from aliphatic polyamides, thermoplastic aromatic copolyamides, aromatic nuclear-hydrogenated copolyamides and the like. Examples thereof are as mentioned below. The polyamide (c) is not limited to these examples.

Aliphatic polyamides: These are able to be prepared by linking at least one saturated aliphatic dicarboxylic acid to at least one aliphatic diamine or by ring opening polymerization of lactam. Examples are nylon 6, nylon 66, nylon 46, nylon 10, nylon 11, nylon 12 and nylon 66/6 copolymer.

Thermoplastic aromatic copolyamides: These are copolyamides containing an aromatic component. These thermoplastic copolyamides containing aromatic component mean polyamides mainly composed of at least one aromatic amino acid or aromatic diamine and/or at least one aromatic dicarboxylic acid. Isocyanates may be used in place of the diamines. The optionally used copolymeric component has no special limitation. Examples of the thermoplastic aromatic copolyamides are copolymeric polyamides of p-aminomethylbenzoic acid and ε-caprolactam (nylon AHBA/6) and polyamides mainly composed of 2,2,4-/2,4,4-trimethylhexamethylenediamine.terephthalic acid salts (nylon THDT, THDT/6I).

Aromatic nuclear-hydrogenated copolyamides: These are copolyamides obtained by subjecting a part or the whole of aromatic ring of the aromatic monomers used for preparation of the above-mentioned aromatic copolyamides to nuclear-hydrogenation.

Blending ratio of the polyphenylene ether (a), the alkenyl aromatic resin (b) and the polyamide (c) is as follows.

| (a) polyphenylene ether | 1–60% by weight |
|---|---|
| (b) alkenyl aromatic resin | 0–60% by weight |
| (c) polyamide | 40–99% by weight |

The compatibilizing agent (f) used in the present invention is added for improving the compatibility between the polyphenylene ether and the polyamide, namely, for solving the problem that since the polyphenylene ether (a) and the polyamide (c) are inherently inferior in affinity for each other, the PPE particles be able to be dispersed only with a particle size of more than about 10 microns when the two are simultaneously melt kneaded and only very poor mechanical properties be able to be obtained.

At least one compound selected from the following groups ①-⑨ is preferred as the compatibilizing agent.

① Epoxy compounds having neither ethylenic nor acetylenic unsaturated bond.

② Compounds having in one molecule both (i) at least one unsaturated group, namely, carbon-carbon double bond or carbon-carbon triple bond and (ii) at least one polar group.

③ Oxidized polyolefin waxes.

④ Silane compounds having in their molecular structure both (i) at least one silicon atom which bonds to a carbon atom through an oxygen bridge and (ii) at least ethylenic carbon-carbon double bond or carbon-carbon triple bond and/or a functional group selected from an amino group and a mercapto group with a proviso that said functional group does not directly bond to the silicon atom.

⑤ Compounds having in one molecule both (i) (OR) (where R is a hydrogen atom, an alkyl group, an aryl group, an acyl group or a carbonyldioxy group) and (ii) at least two same or different functional groups selected from carboxyl group, acid halide group, acid anhydride group, acid halide anhydride group, acid ester group, acid amide group, imide group, amino group and salts thereof.

⑥ Compounds having in one molecule both (i) acid halide group and (ii) at least one of carboxyl group, carboxylic anhydride group, acid ester group and acid amide group.

⑦ Copolymers having unit of vinyl aromatic compounds and unit of α,β-unsaturated dicarboxylic acids or dicarboxylic acid anhydrides or unit of vinyl aromatic compounds and unit of imide compounds of α,β-unsaturated dicarboxylic acids.

⑧ Polyphenylene ethers made functional with at least one compatibilizing agent selected from the above groups ①-② and ④-⑥.

⑨ Compositions obtained by melt kneading a polyphenylene ether made functional with at least one compatibilizing agent selected from the above groups ①-⑦ and a small amount of a polyamide.

The compatibilizing agents of the group ① include the following compounds.

(1) Condensates of polyhydric phenols (such as bisphenol A, tetrabromobisphenol A and resorcin) and epichlorohydrin and (2) condensates of polyhydric alcohols (such as ethylene glycol, propylene glycol and polyethylene glycol) and epichlorohydrin.

The compatibilizing agents of the group ② include compounds having in one molecule both an unsaturated group, namely, carbon-carbon double bond or carbon-carbon triple bond and a polar group, namely, functional group having affinity for or chemical reactivity with the amide bond contained in the polyamide resin or carboxyl group or amino group present at the end of chains.

As the functional group, mention may be made of carboxyl group, functional groups such as those derived from carboxylic acids, namely, groups obtained by substitution for hydrogen atom or hydroxyl group of carboxyl group, such as salt or ester groups, acid amide group, acid anhydride group, imide group, acid azide group and acid halide group, oxazoline group and nitrile group; epoxy group, amino group, hydroxyl group and isocyanate ester group and there may be used compounds having both the unsaturated group and the polar group, namely, unsaturated carboxylic acids, unsaturated carboxylic acid derivatives, unsaturated epoxy compounds, unsaturated alcohols, unsaturated amines and unsaturated isocyanate esters.

Examples are maleic acid, maleic anhydride, fumaric acid, maleimide, maleic hydrazide and reaction products of maleic anhydride and diamines, for example, those having the structure represented by the following formula:

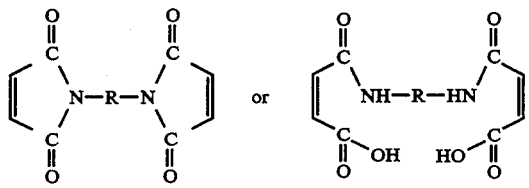

wherein R represents an aliphatic or aromatic group.

Further examples are methyl nadic anhydride, dichloromaleic anhydride, maleinamide, itaconic acid, itaconic anhydride; natural fats and oils such as soybean oil, tung oil, caster oil, linseed oil, hempseed oil, cottonseed oil, sesame oil, rapeseed oil, peanut oil, tsubaki oil, olive oil, coconut oil, and sardine oil; epoxidized natural fats and oils; unsaturated carboxylic acids such as acrylic acid, bitenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-hexadienoic acid, diallylacetic acid, geranic acid, 2,4-decadienoic acid, 2,4-dodecadienoic acid. 9,12-hexadecadienoic acid, 9,12-octadecadienoic acid, hexadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid and triacontenoic acid.

Further, esters, acid amides and anhydrides of these unsaturated carboxylic acids; unsaturated alcohols such as allyl alcohol, crotyl alcohol, methylvinylcarbinol, allylcarbinol, methylpropenylcarbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol; alcohols represented by the formulas $C_nH_{2n-5}OH$, $C_nH_{2n-7}OH$, and $C_nH_{2n-9}OH$ (wherein n is a positive integer); unsaturated alcohols such as 3-butene-1,2-diol, 2,5-dimethyl-3-hexene-2,5-diol, 1,5-hexadiene-3,4-diol, and 2,6-octadiene-4,5-diol; unsaturated amines prepared by substituting the OH group of these unsaturated alcohols with —NH$_2$ group; glycidyl acrylate, glycidyl methacrylate, and allyl glycidyl ether.

Further examples are low molecular weight polymers, for example, having an average molecular weight of about 500–10000 or high molecular weight polymers, for example, having an average molecular weight of 10000 or more such as of butadiene and isoprene to which maleic anhydride or a phenol is added or into which amino group, carboxyl group, hydroxyl group or epoxy group is introduced, and allyl isocyanate.

It is needless to say that the compounds having in their molecule both unsaturated group and polar group include compounds containing two or more unsaturated groups and two or more identical or different polar groups. It is also possible to use two or more of these compounds.

Among them, preferred are maleic anhydride, maleic acid, fumaric acid, itaconic anhydride, itaconic acid, glycidyl acrylate and glycidyl methacrylate and more preferred are maleic anhydride and fumaric acid.

The comptibilizing agents of the group ③ are usually prepared by oxidizing polyolefin waxes in the air or in suspension and polyethylene wax is suitable.

The compatibilizing agents of the group ④ are silane compounds having in the molecular structure both (a) at least one silicon atom which bonds to a carbon atom through an oxygen bridge and (b) at least ethylenic carbon-carbon double bond or carbon-carbon triple bond and/or a functional group selected from an amino group and a mercapto group, and said functional group does not bond to the silicon atom. Examples of the silane compounds are γ-aminopropyltriethoxysilane and 2-(3-cyclohexyl)ethyltrimethoxysilane.

The compatibilizing agents of the group ⑤ are aliphatic polycarboxylic acids, acid esters or acid amides thereof and are saturated aliphatic polycarboxylic acids and derivatives thereof represented by the following formula:

$$(R_1O)_mR(COOR_2)_n(CONR_3R_4)_l$$

wherein R represents a linear or branched chain saturated aliphatic hydrocarbon group of 2–20, preferably 2–10 carbon atoms and R$_1$ represents a hydrogen atom, an alkyl group, an aryl group, an acyl group or a carbonyldioxy group, preferably a hydrogen atom, R$_2$ represents a hydrogen atom or an alkyl or aryl group of 1–20, preferably 1–10 carbon atoms; R$_3$ and R$_4$ each represents a hydrogen atom or an alkyl or aryl group of 1–10, preferably 1–6, more preferably 1–4 carbon atoms; m=1, (n+l) is an integer of 2 or more, preferably 2 or 3, n is an integer of 0 or more, l is an integer of 0 or more; and (R$_1$O) is at α or β position of the carbonyl group and 2–6 carbon atoms are present between two carbonyl groups.

Examples of the compatibilizing agents of the group ⑤ are ester compounds, amide compounds, anhydrides, hydrates and salts of the saturated aliphatic polycarboxylic acids. Examples of the saturated aliphatic polycarboxylic acids are citric acid, malic acid and agaricic acid.

Details of these compounds are disclosed in Patent Kohyo No. 61-502195.

The compatibilizing agents of the group ⑥ are compounds represented by the formula:

$$(I)—Z—(II)$$

wherein (I) is at least a group of the formula (X—CO)— (wherein X is F, Cl, B, I, OH, OR or —O—CO—R wherein R is H, an alkyl group or an aryl group), (II) is at least a carboxyl group, an acid anhydride group, an acid amide group, an imide group, a carboxylate group, an amino group or a hydroxyl group, and the groups (I) and (II) covalently bond through linkage Z which is a divalent hydrocarbon.

Examples of the above compounds are chloroformylsuccinic anhydride, chloroethanoylsuccinic anhydride, anhydrotrimellitic acid chloride, anhydrotrimellitic acetic anhydride and terephthalic acid chloride.

The compatibilizing agents (f) used in the present invention are not limited to the above-mentioned compounds of the groups ①-⑨ and may be any compounds which are used for improving the compatibility of the polyphenylene ether (a) and the polyamide (c). These may be used each alone or in combination of two or more. Amount of the compatibilizing agent is such that necessary for improving the compatibility of (a) and (c) and is preferably in the range of from 0.01 to 30 parts by weight based on totally 100 parts by weight of the polyphenylene ether (a) and the polyamide (c). If the amount exceeds 30 parts by weight, there occurs reduction of heat resistance or considerable reduction of strength due to decomposition. More preferred amount is in the range of from 0.05 to 25 parts by weight. Radical initiators may be used together with the compatibilizing agent.

The polyolefins (d) having a modulus of 10000 kg/cm$^2$ or more at room temperature used in the present invention are polyolefins which are obtained by polymerizing at least one olefin selected from ethylene, propylene, butene-1, pentene-1, 4-methylpentene-1, isobutylene, 1,4-hexadiene, dicyclopentadiene, 2,5-norbornadiene, 5-ethylidenenorbornene, 5-ethyl-2,5-norbornadiene, 5-(1'-propenyl)-2-norbornene and styrene and which have a modulus of 10000 kg/cm$^2$ or more at room temperature.

Preferred are polyolefins such as polypropylene, high-density polyethylene and poly(4-methylpentene-1) which have a modulus of 10000 kg/cm$^2$ or more at room temperature.

Use of polyolefins having a modulus of less than 10000 kg/cm$^2$ at room temperature such as exemplified in Japanese Patent Kokai No. 2-656 is not preferred because modulus of the resulting composition is low.

More preferred are modified polyolefins obtained by grafting the compatibilizing agents (f) on the polyolefins using radical formers or by introducing the compatibilizing agents at the time of polymerization. Examples are maleic anhydride-modified polypropylenes, fumaric acid-modified polypropylenes and acrylic acid-modified polypropylenes. By using these polyolefins, rigidity when absorbing water be able to be improved without damaging impact strength.

Amount of the polyolefin (d) is in the range of from 1 to 50 parts by weight based on totally 100 parts by weight of the polyphenylene ether (a), the alkenyl aromatic resin (b) and the polyamide (c). If the amount exceeds 50 parts by weight, there occurs considerable reduction in heat resistance and impact strength of the resin composition and in adhesion of coating film.

The unhydrogenated alkenyl aromatic block copolymer (e) are block-like copolymers of the above-mentioned alkenyl aromatic compounds with, for example, butadiene and isoprene. Examples are styrene-butadiene block copolymer, styrene-butadiene-styrene block copolymer, styrene-isoprene block copolymer and mixtures thereof. Preferred is a styrene-butadiene-styrene block copolymer and more preferred is a styrene-butadiene-styrene block copolymer in which the total molecular weight of the styrene blocks is larger than the molecular weight of the butadiene block and this block copolymer provides excellent adhesion of coating film and rigidity when absorbing water.

However, partially hydrogenated styrene-butadiene-styrene block copolymer, partially hydrogenated styrene-butadiene block copolymer and partially hydrogenated styrene-isoprene block copolymer in which the butadiene block or isoprene block is hydrogenated such as those exemplified in Japanese Patent Kokai No. 2-395854 are not preferred because they cause deterioration in adhesion of coating film.

Amount of the unhydrogenated alkenyl aromatic block copolymer (e) is in the range of from 1 to 50 parts by weight based on totally 100 parts by weight of the polyphenylene ether (a), the alkenyl aromatic resin (b) and the polyamide (c). If the amount exceeds 50 parts by weight, heat resistance and rigidity of the resulting resin composition considerably deteriorate.

If necessary, fillers may be added to the resin composition for improvement of rigidity or hardness. Suitable fillers include calcium carbonate, magnesium carbonate, aluminum hydroxide, magnesium hydroxide, zinc oxide, titanium oxide, magnesium oxide, aluminum silicate, magnesium silicate, calcium silicate, silicic acid, hydrated calcium silicate, hydrated aluminum silicate, mica, xonotlite, potassium titanate whiskers, magnesium oxysulfate, glass balloons, glass beads, inorganic fibers such as glass fibers, carbon fibers and stainless steel fibers, aramid fibers and carbon black. These fillers may be addedeach alone or in combination of two or more. The fillers are not limited to those which are enumerated above.

The thermoplastic resin composition of the present invention is obtained by blending firstly the components (a), (d) and (f) by known methods and melt kneading them (1st step) and then secondly said (c) therewith (2nd step). The sequence of blending and kneading of the components (a), (d), (f) and (c) is limitative and the other components may be melt kneaded in 1st or 2nd step. Alternatively, a plurality of feed openings are provided in one extruder and said respective components may be successively fed from the openings along the cylinder.

Customary additives such as flame retardants, plasticizers, anti-oxidants and weathering agents may further be added to the composition of the present invention. Further preferable effects can be obtained especially when known materials are used as additives for the polyphenylene ether or the polyamide.

A preferred embodiment of the present invention is as follows.

A thermoplastic resin composition comprising:

| | | |
|---|---|---|
| (a) | Polyphenylene ether | 5–35% by weight |
| (c) | Polyamide | 40–85% by weight |
| (d) | Polyolefin modified with maleic anhydride | 5–30% by weight |
| (e) | Styrene-butadiene-styrene block copolymer | 5–30% by weight and |
| (f) | A compatibilizing agent in an amount necessary to improve compatibility of (a) and (c). | |

The following examples explain the present invention in more detail. It should be understood that they are exemplary only, and should not be construed as limiting the invention in any manner.

In the following Examples 1–10 and Comparative Examples 1–5, firstly the polyphenylene ether (a), the compatibilizing agent (f), the polyolefin (d) and, optionally, a radical former were introduced from the first feed opening of twin-screw kneader TEM 50 manufactured by Toshiba Machine Co., Ltd. and melt kneaded at a cylinder temperature of 260° C. (the 1st step). Then, the other components were introduced from the second feed opening and, if necessary, the third feed opening provided between the second feed opening and a die and melt kneading was again carried out (the 2nd step).

Then, the molten resin extruded from the die was cooled in a water tank and pelletized by a strand cutter.

The resulting pellets were vacuum dried at 130° C. for 4 hours and then test pieces were molded therefrom by an injection molding machine IS220EN manufactured by Toshiba Machine Co., Ltd. under the conditions of cylinder temperature: 270° C., injection pressure: 1200 kg/cm$^2$ and mold temperature: 80° C.

The resulting test pieces were evaluated on the properties in the following manner.

Melt index (MI) (g/10 min):

The pellets of the resin compositions were vacuum dried at 140° C. for 4 hours. Then, melt index was measured at 280° C. under load of 5 kg.

Izod impact strength (kg. cm/cm):

Test pieces of 3.2 mm thick for Izod test were molded by injection molding machine and were notched and subjected to the impact test in an atmosphere of 23° C. in accordance with ASTM D256.

Flexural modulus (kg/cm$^2$):

Test pieces of 3.2 mm thick for flexural test were molded by injection molding machine and subjected to the flexural test in an atmosphere of 23° C. in accordance with ASTM D790.

Flexural modulus when absorbing water (kg/cm$^2$):

Test pieces of 3.2 mm thick for flexural test were molded by an injection molding machine and were left to stand for 24 hours in a thermo-hygrostat of 50° C. and 95% RH to absorb water. Then, the test pieces were subjected to the flexural test in an atmosphere of 23° C. in accordance with ASTM D790.

Heat distortion test H.D.T. (°C.):

Test pieces of 6.4 mm thick for heat distortion test were molded by an injection molding machine and subjected to the heat distortion test in accordance with ASTM D648.

Adhesion of coating film (%):

Evaluation was conducted on a plate of 150×150×3 mm obtained by injection molding. The plate was coated with ORIGINPLANET PH 04 (manufactured by Origin Electric Co.) at a thickness of about 25–30 μm by a coating gun under usual conditions and dried at 80° C. for 30 minutes in an oven. Then, the coated plate was subjected to the cellophane tape peeling test (which comprises crosscutting the coating film by a knife to form 100 squares of about 2 mm side, then applying a cellophane tape thereto, peeling the tape and measuring percentage of retention of the squares of the coating film) after elapses of 1 hr, 2 hr, 5 hr, 12 hr and 24 hr. Adhesion of the coating film was evaluated in this way.

Peeling Test:

A plate of 150×150×3 mm obtained by injection molding of the composition was used. Then, the plate was subjected to the peeling test which comprises cutting a surface of it near around a gate along the flow direction of the composition by a knife in 5 mm width, then peeling one end of the cut.

Peeling . . . None (Good), Existence (Bad)

The following starting materials were prepared for obtaining the compositions of the examples and the comparative examples.

Polyphenylene ether (PPE):

A polyphenylene ether obtained by homopolymerization of 2,6-dimethylphenol and having an inherent viscosity of 0.46 in chloroform solution (concentration: 0.5 g/dl) at 30° C. was used.

Polyamides:

PA-A: Nylon 6 having a number-average molecular weight of 17500

PA-B: Nylon 6 having a number-average molecular weight of 12000

Polyolefins:

PP: SUMITOMO NOBLEN Z101A manufactured by Sumitomo Chemical Co., Ltd.

MAH-PP: Polypropylene on which 0.08 wt % of maleic anhydride was grafted and which had a melt index of 30 g/10 min at 230° C. under a load of 2.16 kg LDPE: SUMIKATHEN G201 manufactured by Sumitomo Chemical Co., Ltd.

MAH-EPR: Ethylene.propylene rubber on which 1.5 wt % of maleic anhydride was grafted and which had an ethylene/propylene ratio of 78/22 and a melt index of 0.3 g/10 min at 230° C. under a load of 2.16 kg Alkenyl aromatic block copolymers:

SBS-1: Styrene-butadiene-styrene block copolymer CARIFLEX TR1101 (styrene/butadiene=30/70 by weight) manufactured by Shell Chemical Co.

SBS-2: Styrene-butadiene-styrene block copolymer TR2400 (styrene/butadiene=60/40 by weight) manufactured by Japan Synthetic Rubber Co., Ltd.

SBS-3: Styrene-butadiene-styrene block copolymer TR2000 (styrene/butadiene=40/60 by weight) manufactured by Japan Synthetic Rubber Co., Ltd.

SBS-4: Styrene-butadiene-styrene block copolymer TR2250 (styrene/butadiene=52/48 by weight) manufactured by Japan Synthetic Rubber Co., Ltd.

SEBS-1: Hydrogenated styrene-butadiene-styrene block copolymer KRATON G1651 manufactured by Shell Chemical Co.

Compatibilizing agents:

MAH: Maleic anhydride

CA: Citric acid

Radical former:

PO: Dicumyl peroxide

Inorganic fillers:

TiO$_2$: TIPAQUE CR60 manufactured by Ishihara Sangyo Kaisha, Ltd.

Talc: MICRON WHITE 5000S manufactured by Hayashi Kasei Co.

Other additives:

Znst: Zinc stearate

MAcZn: Zinc dimethacrylate

EXAMPLES 1-5

Compositions and results of measurement of the properties are shown in Table 1 and Table 5.

COMPARATIVE EXAMPLES 1-5

In Comparative Examples 1 and 2, LDPE and MAH-EPR were used in place of MAH-PP in Example 4, respectively.

In Comparative Example 3, SEBS-1 was used in place of SBS-3 in Example 4.

Comparative Example 4 is an example where the compatibilizing agent was not used.

Comparative Example 5 is an example where the polyolefin was not used.

The results of measurement are shown in Table 2 and Table 5.

EXAMPLES 6-10

Compositions and results of measurement of the properties when amount of PPE was changed are shown in Table 3, Table 4 and Table 5.

Comparative Example 6 is an example where MAH-PP was added in the 2nd step instead of the 1st step as in Example 10.

Comparative Example 7 is an example where MAH-PP was added in the 2nd step instead of the 1st step as in Example 8.

The results of measurement are shown in Table 4 and Table 5.

TABLE 1

|  | Example 1 | Example 2 | Example 3 | Example 4 | Example 5 |
|---|---|---|---|---|---|
| PPE | 35 | 35 | 35 | 35 | 35 |
| PA-A | 40 | 40 | 40 | 40 | 40 |
| PA-B |  |  |  |  |  |
| MAH | 0.2 | 0.2 | 0.2 | 0.2 |  |
| CA |  |  |  |  | 0.3 |
| SBS-1 | 15 | 15 |  |  |  |
| SBS-2 |  |  | 15 |  | 15 |
| SBS-3 |  |  |  | 15 |  |
| SEBS-1 |  |  |  |  |  |
| PP | 10 |  |  |  |  |
| MAH-PP |  | 10 | 10 | 10 | 10 |
| LDPE |  |  |  |  |  |
| MAH-EPR |  |  |  |  |  |
| TiO₂ |  |  |  |  |  |
| Talc |  |  |  |  |  |
| Znst |  |  |  |  |  |
| MAcZn |  |  |  |  |  |
| MI | 25 | 17 | 20 | 19 | 21 |
| Izod impact strength | 16 | 42 | 32 | 40 | 31 |
| Flexural modulus | 19100 | 18900 | 23000 | 20100 | 22900 |
| Flexural modulus when absorbing water | 14100 | 13900 | 15800 | 14500 | 15700 |
| H.D.T. | 165 | 164 | 158 | 161 | 159 |

TABLE 2

|  | Comparative example 1 | Comparative example 2 | Comparative example 3 | Comparative example 4 | Comparative example 5 |
|---|---|---|---|---|---|
| PPE | 35 | 35 | 35 | 35 | 15 |
| PA-A | 40 | 40 | 40 | 40 | 70 |
| PA-B |  |  |  |  |  |
| MAH | 0.2 | 0.2 | 0.2 |  | 0.2 |
| CA |  |  |  |  |  |
| SBS-1 |  |  |  |  | 15 |
| SBS-2 |  |  |  |  |  |
| SBS-3 | 15 | 15 |  | 15 |  |
| SEBS-1 |  |  | 15 |  |  |
| PP |  |  |  |  |  |
| MAH-PP |  |  | 10 | 10 |  |
| LDPE | 10 |  |  |  |  |
| MAH-EPR |  | 10 |  |  |  |
| TiO₂ |  |  |  |  |  |
| Talc |  |  |  |  |  |
| MAcZn |  | Znst |  |  |  |
| MI | 21 | 13 | 22 | 29 | 48 |
| Izod impact strength | 16 | 53 | 43 | 5 | 55 |
| Flexural modulus | 18300 | 17100 | 19700 | 20100 | 23200 |
| Flexural modulus when absorbing water | 9900 | 9500 | 14200 | 10500 | 8700 |
| H.D.T. | 136 | 127 | 157 | 154 | 169 |

TABLE 3

|  | Example 6 | Example 7 | Example 8 | Example 9 |
|---|---|---|---|---|
| PPE | 15 | 15 | 15 | 15 |
| PA-A | 25 | 25 | 25 | 25 |
| PA-B | 35 | 35 | 35 | 35 |
| MAH | 0.1 | 0.1 | 0.1 | 0.1 |
| CA |  |  |  |  |
| SBS-1 | 15 | 15 |  |  |
| SBS-2 |  |  | 15 |  |
| SBS-3 |  |  |  | 15 |
| SEBS-1 |  |  |  |  |
| PP |  |  |  |  |
| MAH-PP | 10 | 10 | 10 | 10 |
| LDPE |  |  |  |  |
| MAH-EPR |  |  |  |  |
| TiO₂ |  | 5 |  |  |
| Talc |  |  |  | 2 |
| Znst |  | 0.2 |  |  |
| MAcZn |  |  | 0.2 |  |
| MI | 37 | 36 | 47 | 45 |
| Izod impact strength | 21 | 16 | 20 | 19 |
| Flexural modulus | 18900 | 20100 | 22700 | 21900 |
| Flexural modulus when absorbing water | 9900 | 10500 | 11800 | 11500 |
| H.D.T. | 152 | 153 | 151 | 154 |

TABLE 4

|  | Example 10 | Comparative example 6 | Comparative example 7 |
|---|---|---|---|
| PPE | 15 | 15 | 15 |
| PA-A | 40 | 40 | 25 |
| PA-B |  |  | 35 |
| MAH | 0.1 | 0.1 | 0.1 |
| SBS-2 |  |  | 15 |
| SBS-4 | 15 | 15 |  |
| MAH-PP | 10 | 10 (2nd step) | 10 (2nd step) |
| MI | 30 | 28 | 43 |
| Izod impact strength | 47 | 15 | 14 |
| Flexural modulus | 22,500 | 21,800 | 21,900 |
| Flexural modulus when absorbing water | 11,600 | 11,800 | 11,800 |
| H.D.T. | 149 | 147 | 148 |
| Peeling Test | None | Existence | Existence |

TABLE 5

| | Adhesion of coating film | | | | |
|---|---|---|---|---|---|
| | After 1 hrs | After 2 hrs | After 5 hrs | After 12 hrs | After 24 hrs |
| Example 1 | 63 | 81 | 93 | 98 | 99 |
| Example 2 | 96 | 98 | 100 | 100 | 100 |
| Example 3 | 99.5 | 100 | 100 | 100 | 100 |
| Example 4 | 98 | 99 | 100 | 100 | 100 |
| Example 5 | 99.3 | 100 | 100 | 100 | 100 |
| Example 6 | 95 | 97 | 99 | 99.8 | 100 |
| Example 7 | 99 | 99 | 99.2 | 100 | 100 |
| Example 8 | 99 | 99.9 | 100 | 100 | 100 |
| Example 9 | 96 | 98 | 99 | 99.7 | 100 |
| Example 10 | 99 | 99.9 | 100 | 100 | 100 |
| Comparative Example 1 | 0 | 21 | 57 | 89 | 93 |
| Comparative Example 2 | 0 | 0 | 5 | 37 | 51 |
| Comparative Example 3 | 0 | 0 | 19 | 46 | 73 |
| Comparative Example 4 | 67 | 74 | 91 | 98 | 99 |
| Comparative Example 5 | 99.8 | 100 | 100 | 100 | 100 |
| Comparative Example 6 | 73 | 89 | 93 | 98 | 99 |
| Comparative Example 7 | 69 | 87 | 91 | 97 | 99 |

As explained above, the present invention can provide a resin composition having a satisfactory balance of rigidity, impact strength and adhesion of coating film and a superior processability by adding a specific polyolefin/a specific alkenyl aromatic block copolymer to a polyphenylene/polyamide resin composition.

What is claimed is:

1. A thermoplastic resin composition which comprises:

a total of 100 parts by weight of (a)–(c) wherein (a) is 1–60% by weight of a polyphenylene ether, (b) is 0–60% by weight of an alkenyl aromatic resin excluding unhydrogenated alkenyl aromatic block copolymer of the following component (e), and (c) is 40–99% by weight of a polyamide, (d) is 1–50 parts by weight of a polypropylene having a modulus of 10,000 kg/cm$^2$ or more at room temperature which is modified with the following compatibilizing agent (f), (e) is 1–50 parts by weight of an unhydrogenated alkenyl aromatic block copolymer, and (f) is a compatibilizing agent in an amount necessary to improve compatibility of the above components (a) and (c), said (d)–(f) being every 100 parts by weight of (a)–(c), and wherein the thermoplastic resin composition is obtained by melt kneading firstly said (a), (d) and (f), and then secondly said (c) therewith, wherein said compatibilizing agent (f) is at least one compound selected from the following groups (1) epoxy compounds having neither ethylenic nor acetylenic unsaturated bonds, (2) compounds having in one molecule both (i) at least one unsaturated group selected from carbon-carbon double bond and carbon-carbon triple bond and (ii) at least one polar group, (3) oxidized polyolefin waxes, (4) silane compounds having in one molecular structure both (i) at least one silicon atom which bonds to a carbon atom through an oxygen bridge and (ii) at least an ethylenic carbon-carbon double bond or a carbon-carbon triple bond and/or a functional group selected from the group consisting of an amino group and a mercapto group with a proviso that said functional group does not directly bond to the silicon atom, (5) compounds having in one molecule both (i) (OR) wherein R is a hydrogen atom, an alkyl group, an aryl group, an acyl group or a carbonyldioxy group and (ii) at least two same or different functional groups selected from the group consisting of a carboxyl group, an acid halide group, an acid anhydride group, an acid halide anhydride group, an acid ester group, an acid amide group, an imide group, an amino group and salts thereof, (6) compounds having in one molecule both (i) acid halide group and (ii) at least one member selected from the group consisting of a carboxyl group, a carboxylic acid anhydride group, an acid ester group and an acid amide group, (7) copolymers having a unit of vinyl aromatic compound and an α unit of α,β-unsaturated dicarboxylic acid or dicarboxylic acid anhydride or copolymers having a unit of a vinyl aromatic compound and a unit of an imide compound of α,β-unsaturated dicarboxylic acid, (8) polyphenylene ethers functionalized with at least one compatibilizing agent selected from the above groups (1)–(2) and (4)–(6), and (9) compositions obtained by melt kneading a polyphenylene ether functionalized with at least one compatibilizing agent selected from the above groups (1)–(7) and a small amount of a polyamide.

2. A thermoplastic resin composition according to claim 1, wherein the compatibilizing agent (f) is at least one compound selected from the group consisting of maleic anhydride, maleic acid, fumaric acid, itaconic acid, citric acid and malic acid.

3. A thermoplastic resin composition according to claim 1, wherein the alkenyl aromatic block copolymer (e) is a styrene-butadiene-styrene block copolymer.

4. A thermoplastic resin composition according to claim 1, wherein the alkenyl aromatic block copolymer (e) is a styrene-butadiene-styrene block copolymer in which the total molecular weight of the styrene blocks is larger than the molecular weight of the butadiene block.

5. A thermoplastic resin composition according to claim 1 which comprises:

(a) 5–35% by weight of a polyphenylene ether, (c) 40–85% by weight of a polyamide, (d) 5–30% by weight of a polypropylene modified with maleic anhydride, (e) 5–30% by weight of a styrene-butadiene-styrene block copolymer, and (f) a compatibilizing agent in an amount necessary to improve compatibility of the components (a) and (c).

6. A thermoplastic resin composition according to claim 1, wherein the alkenyl aromatic block copolymer (e) is a styrene-butadiene-styrene block copolymer in which the styrene content is 50–80% by weight.

* * * * *

UNITED STATES PATENT AND TRADEMARK OFFICE
CERTIFICATE OF CORRECTION

PATENT NO.   : 5,424,360

DATED        : June 13, 1995

INVENTOR(S)  : Kenji Nagaoka; Hiroshi Hagimori; Takashi Sanada

It is certified that error appears in the above-identified patent and that said Letters Patent is hereby corrected as shown below:

ON THE COVER PAGE: insert Item

[30]    Foreign Application Priority Data

Dec. 16, 1992  [JP]    Japan.................335762/92

Signed and Sealed this

Seventh Day of May, 1996

Attest:

BRUCE LEHMAN

Attesting Officer    Commissioner of Patents and Trademarks